US010001968B1

(12) United States Patent
Slick

(10) Patent No.: US 10,001,968 B1
(45) Date of Patent: Jun. 19, 2018

(54) MONITOR MIXING APPARATUS THAT PRESENTS EACH MUSICIAN WITH SUMMARY CONTROL OF BOTH THEIR CONTRIBUTED CHANNELS AND THE REMAINING CHANNELS, FOR RAPID AND ACCURATE SOUND BALANCE

(71) Applicant: Audio Fusion Systems, LLC, Austin, TX (US)

(72) Inventor: Kevin R. Slick, Austin, TX (US)

(73) Assignee: Audio Fusion Systems, LLC, Austin, TX (US)

( * ) Notice: Subject to any disclaimer, the term of this patent is extended or adjusted under 35 U.S.C. 154(b) by 0 days. days.

(21) Appl. No.: 15/454,049

(22) Filed: Mar. 9, 2017

Related U.S. Application Data

(60) Provisional application No. 62/310,660, filed on Mar. 18, 2016.

(51) Int. Cl.
*H04W 4/80* (2018.01)
*G06F 3/16* (2006.01)
*H04W 4/00* (2018.01)

(52) U.S. Cl.
CPC .............. *G06F 3/165* (2013.01); *H04W 4/008* (2013.01); *H04W 4/80* (2018.02)

(58) Field of Classification Search
CPC .......... G10H 1/0058; G10H 1/46; G10H 1/18; G10H 2210/281; G10H 2240/175; G10H 2210/195; G10H 2240/211; H04H 60/05; H04H 60/04
USPC ................................... 381/80, 107, 109, 119
See application file for complete search history.

(56) References Cited

U.S. PATENT DOCUMENTS

| 2003/0063760 | A1* | 4/2003 | Cresci | H04H 60/04 381/103 |
| 2004/0208328 | A1* | 10/2004 | Strother | H04S 7/30 381/119 |
| 2011/0096934 | A1* | 4/2011 | Babarskas | H04R 1/10 381/58 |

(Continued)

OTHER PUBLICATIONS

Universal Control 1.6, StudioLive Remote 1.3, and Qmix 1.1 Addendum for StudioLive Mixers, PreSonus Audio Electronics, Inc., 7257 Florida Boulevard, Baton Rouge, Louisiana 70806 USA, 2012, 60 pages.

*Primary Examiner* — Melur Ramakrishnaiah
(74) *Attorney, Agent, or Firm* — Meyertons, Hood, Kivlin, Kowert & Goetzel, P.C.; Lawrence J. Merkel

(57) ABSTRACT

In an embodiment, a monitor mixing system is provided in which each musician has one or more portable electronic devices (e.g. smart phones, tablets, etc.) that are programmable to select the owner of a plurality of channels of digital audio as either the musician or the band (e.g. one of the other musicians). The device may also be programmable to control the volume of the musicians own channel independently from the volume of the remaining channels, in an embodiment, and may be programmable with a master volume control as well. The plurality of channels of digital audio may be mixed according to the controls and played back for the musician over the device's audio output. In an embodiment, a simple and efficient interface may give the musician considerable control over his/her monitor mix and may free the musician to move about the stage as desired.

19 Claims, 5 Drawing Sheets

(56) References Cited

U.S. PATENT DOCUMENTS

| | | | |
|---|---|---|---|
| 2012/0008801 A1* | 1/2012 | Morrison | H03G 3/04 |
| | | | 381/107 |
| 2014/0083278 A1* | 3/2014 | Dietz | H04R 5/027 |
| | | | 84/466 |
| 2014/0260924 A1* | 9/2014 | Skillings | G10H 1/0058 |
| | | | 84/742 |

* cited by examiner

MONITOR MIXING APPARATUS THAT PRESENTS EACH MUSICIAN WITH SUMMARY CONTROL OF BOTH THEIR CONTRIBUTED CHANNELS AND THE REMAINING CHANNELS, FOR RAPID AND ACCURATE SOUND BALANCE

This application claims benefit of priority to U.S. Provisional Patent Application Ser. No. 62/310,660, filed on Mar. 18, 2016. The above application is incorporated herein by reference in its entirety. To the extent that anything in the above application conflicts with material expressly set forth herein, the material expressly set forth herein controls.

BACKGROUND

Technical Field

Embodiments described herein are related to electronic devices in a music monitor system for mixing music channels for a musician participating in the performance of the music.

Description of the Related Art

When performing live music, the musicians in a band generally need to be able to hear the music they are producing. In an amplified music environment such as a concert hall, the music is being projected to the audience from an area generally in front of the musicians (and possibly to either side), which prevents the musicians from hearing the music effectively.

Typical music monitors include one of two types: fixed mixers that are connected to speakers in front of the musicians and facing the musicians, or fixed mixers connected to a wired earphone. In either case, the musician's ability to move about the stage is restricted by needing to remain near the musician's speaker or mixer.

Furthermore, the musician may need to adjust the mix of channels that the musician is monitoring during the performance. The musician may desire different mixes based on the instruments involved in a given piece, the type of music, etc. Adjusting the mix is often performed by a sound engineer off stage, which requires communication between the musician and the engineer. Even simple changes may be error prone due to the difficulty in communicating back and forth between the musician and the engineer during the show. Alternatively, if the musician has direct control of his/her mix, the complexities of the mixer and modifying during a performance may overwhelm the musician, leading to a suboptimal mix that might even affect the performance.

SUMMARY

In an embodiment, a monitor mixing system is provided in which each musician has one or more portable electronic devices (e.g. smart phones, tablets, etc.) that are programmable to select the owner of a plurality of channels of digital audio as either the musician or the band (e.g. one of the other musicians). The device may also be programmable to control the volume of the musicians own channel independently from the volume of the remaining channels, in an embodiment, and may be programmable with a master volume control as well. The plurality of channels of digital audio may be mixed according to the controls and played back for the musician over the device's audio output. In an embodiment, a simple and efficient interface may give the musician considerable control over his/her monitor mix and may free the musician to move about the stage as desired.

BRIEF DESCRIPTION OF THE DRAWINGS

The following detailed description makes reference to the accompanying drawings, which are now briefly described.

Figure 1:
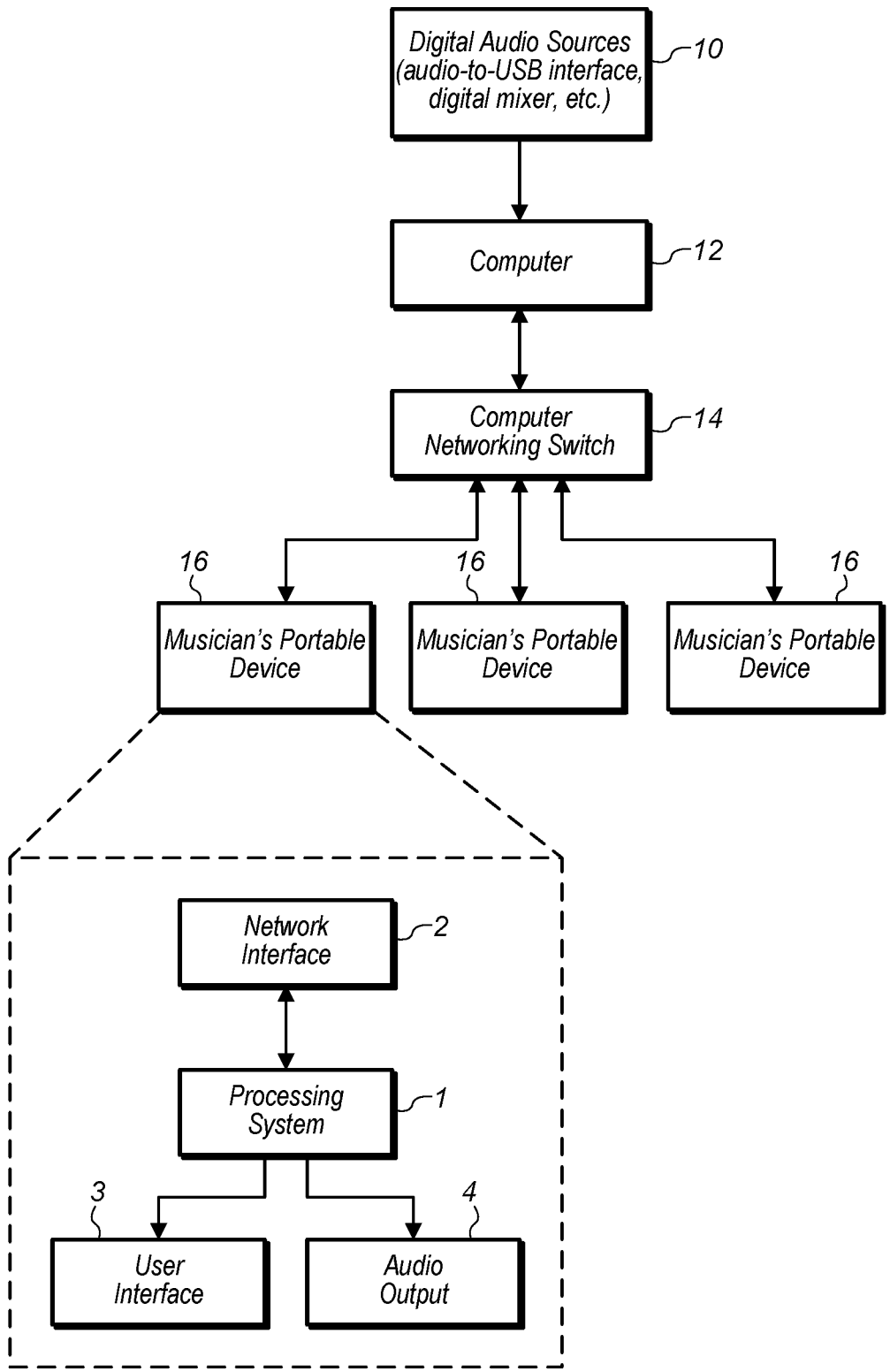
FIG. 1 is a block diagram of one embodiment of a system for providing personalized audio mixes—often referred to as "monitor mixes"—to each musician during a performance or recording session.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Overview

FIG. 1 is a block diagram of one embodiment of a system for providing personalized audio mixes to each musician during a performance, rehearsal, recording session, etc.

Each digital audio source 10 may provide a multi-channel, digital audio stream to the computer 12, by connecting to one of the computer's digital inputs: USB, Firewire, Ethernet, etc. The digital audio sources 10 may include any sort of analog-to-digital converter, digital mixer, or other digital equipment that receives inputs from the band's instruments, microphones, recordings, etc. and provides multi-channel digital audio output.

The computer 12 may combine the audio streams from the digital audio source(s) 10 and send them in packets to the computer networking switch 14, which may then transmit the packets to each of the musician's portable devices 16. Any type of computer 12 may be used (e.g. a laptop or desktop computer).

In some embodiments, the computer 12 may contribute additional features and functions to the monitor mixing system. The additional features may include capabilities that are ancillary to monitor mixing, such as sub-mixing, channel labeling, and device connection management.

The additional features may also include the primary mixing functions that may be contained in the musician's portable devices 16, allowing a monitor engineer or similarly skilled person to control the monitor mix on behalf of the musician. In that case, the computer 12 may create one or more stereo digital audio streams by mixing the multi-channel digital audio stream down to two channels and providing those channels to one or more musician's portable devices 16, rather than forwarding them the original multi-channel digital audio stream.

In some embodiments, the primary functions provided by the computer 12 may be integrated into the digital audio sources 10. That is, the digital audio sources 10 may have the ability to send a multichannel digital audio stream directly to the computer networking switch 14 in such a form as can be then forwarded to the musician's portable devices without the assistance of the computer 12. In that case, the embodiment may not include a computer 12.

The computer networking switch 14 may be connected using any networking technology—such as Ethernet, WiFi, or a combination—to the computer 12 and to each of the musician's portable devices 16. If WiFi is used, any of the WiFi technology standards—such as 802.11n or 802.11ac—may be used.

The musician's portable devices 16 may mix the multiple channels of audio into a stream of 2 channels, for stereo, and then play the 2-channel audio for the musician via the device's internal audio player. Mixing may be performed based on the settings of the channel volume control, channel owner control, master volume control, me volume control, and band volume control. These settings/controls are described in more detail below.

The user (musician) may listen to the audio from the audio output (e.g., headphone jack) of the musician's portable device 16. A wired headphone may be used, or a wireless headphone connected to the mobile device using various wireless standards such as Bluetooth may be used. The musician's portable devices 16 may be any type of portable device that has standard digital networking capability and an audio output. The device may include wearable mobile devices that may be attached to the user/musician or carried on or by the user/musician, such as smart devices. Smart devices may include, for example, personal digital assistants such as the iPod™, iPhone™, or Android devices. Smart devices may also include non-wearable devices such as and iPad™ or other tablet devices. The musician's portable devices 16 may also include laptop computers which may be arranged near the user/musician to permit manipulation of settings by the user/musician. The musician's portable devices 16 may also include specialized hardware designed for the purpose of monitor mixing. A musician's portable device 16 may be any device which is capable of operation without a direct connection to a wall outlet (e.g. on battery power drawn from a battery within the device), even though the device may be plugged in during use at some points.

The musician's portable device 16 may include one or more processors that may be configured to execute code, including an operating system and/or various application programs such as the programs described below. The processors and a memory system storing the code/data executed by the processor may be referred to as a processing system. The device may also include a display on which the user interfaces may be displayed and from which input may be accepted. For example, the display may be a touchscreen display that may be configured to display images generated by the device and that may be configured to detect user touches on the screen. The touchscreen may convey position and/or movement information to the device. Customized hardware devices used as the musician's portable device 16 may include physical input/output hardwire (e.g. knobs, switches, sliders, etc.). Generally, the display and user input hardware may be referred to as a user input/output interface. One of the musician's portable devices 16 in FIG. 1 is shown in exploded view to include the processing system 1, the network interface 2 to receive the multi-channel audio over the network, the user input/output interface 3, and the audio output 4. The processing system 1 is coupled to the network interface 2, the user input/output interface 3, and the audio output 4.

The musician's portable device 16 may further include WiFi circuitry configured to transmit and receive WiFi data packets, including the stream of digital audio packets transmitted by the computer 12. The mobile device 16 may still further include an audio system configured to play a stream of audio output from the audio engine mixer described below (e.g. output to a headphone jack, on a speaker in the mobile device, etc.). Generally, the components of the device may be coupled together (e.g. the WiFi circuitry, the user input/output interface, the processing system, and the audio system).

Human Interface

Figure 2:
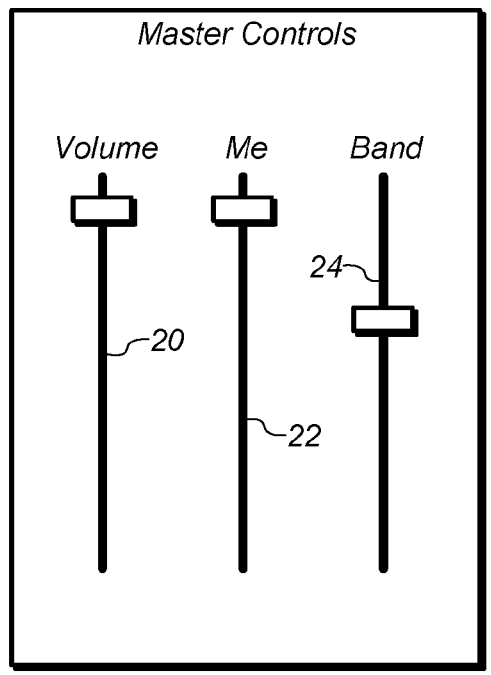
FIG. 2 is an illustration of one embodiment of a set of Master Controls for balancing a musician's audio mix during a performance or recording session.

FIG. 2 is an illustration of one embodiment of a set of master controls for balancing a group of musician's channels with the remaining band members. The controls may be displayed on the musician's portable device 16 when the musician has selected an update to the master controls (e.g. from the home screen of an application that interacts with the other components of the system of FIG. 1, where the application is installed on the musician's portable device 16).

The master slide control 20 may limit the overall output volume. That is, the volume of the mix as played by the device's audio system may be controlled using the master slide control 20. Increased volume may be obtained by sliding the master slide control 20 toward the top of the screen as shown in FIG. 2, and decreased volume may be obtained by sliding the master slide control 20 toward the bottom of the screen as shown in FIG. 2. Thus, the musician's portable device 16 may include a touchscreen in some embodiments. The me slide control 22 may limit the overall output volume of those channels contributed by the listening musician (i.e. the musician who is using the musician's portable device 16). That is, the channels assigned to the musician's instrument (if any) and/or microphone (if any) may be controlled by the me slide control 22. The band slide control 24 may limit the overall volume of those channels contributed by the rest of the band members.

The master controls may provide a convenient, expeditious, and accessible way for a performing musician to quickly adjust the volume level of their own voice or instrument(s), relative to those of the rest of the band. That is, the relative positions of the me control 22 and the band control 24 may indicate the relative volume of the musician's own contributions with respect to the other band members, and the Master slide control may control the overall volume.

Figure 3:
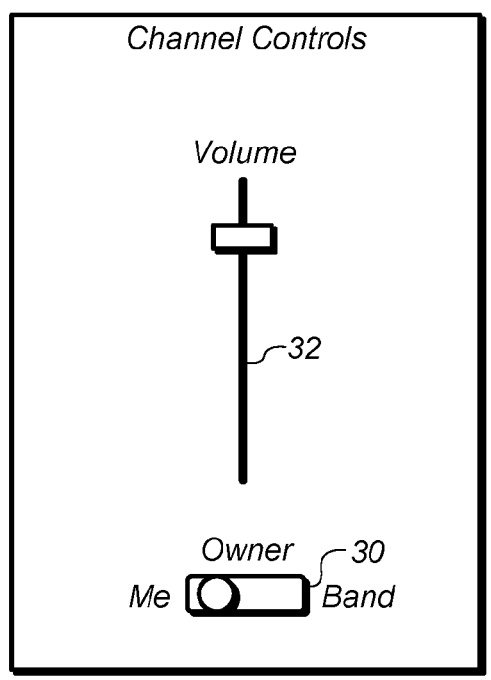
FIG. 3 is an illustration of one embodiment of a set of Channel Controls for assigning an individual channel to a musician and adjusting the channel's volume.

FIG. 3 is an illustration of one embodiment of a set of channel controls 32 for assigning an individual channel to a musician and adjusting the channel's volume. The channel controls may be displayed on the musician's portable device 16 when the musician has selected an update to the channel controls (e.g. from the home screen of an application that interacts with the other components of the system of FIG. 1, where the application is installed on the musician's portable device 16). One such set of controls may exist for each channel of the digital audio stream. If the digital audio stream channel (e.g., channel 1) corresponding to the channel controls is being contributed by the musician that is interacting with the controls, the musician may indicate that ownership of contribution by setting the owner control 30 to the me position. Otherwise, the band position may be selected. The position of the owner control 30 indicates to the musician's portable device 16 which channels belong to which musician, and the audio mixer (see FIG. 4) may use the channel ownership information when applying the correct me/band control level to the gain level calculations for the channel. See Converting Human Interactions to Audio Levels for details.

Thus, the channel controls interface may provide the user/musician with the ability to define which channels are contributed by that user/musician (e.g. instrument(s) and/or microphone) and which channels are contributed by other band members. In combination with the master controls described above with regard to FIG. 2, the channel controls permit each user/musician to customize how much of the overall music is being played back to that user/musician, as well as relative volumes of the music. Each band member may have a different mix (since each band member may have different channels identified as "me" versus "band," and each band member may have different preferences with regard to relative levels of audio from "me" versus "band"). Furthermore, each band member may change his/her mix dynamically throughout the performance (e.g. using different mixes during different songs, or different mixes at different points during the song).

Converting Human Interactions to Audio Levels

Figure 4:
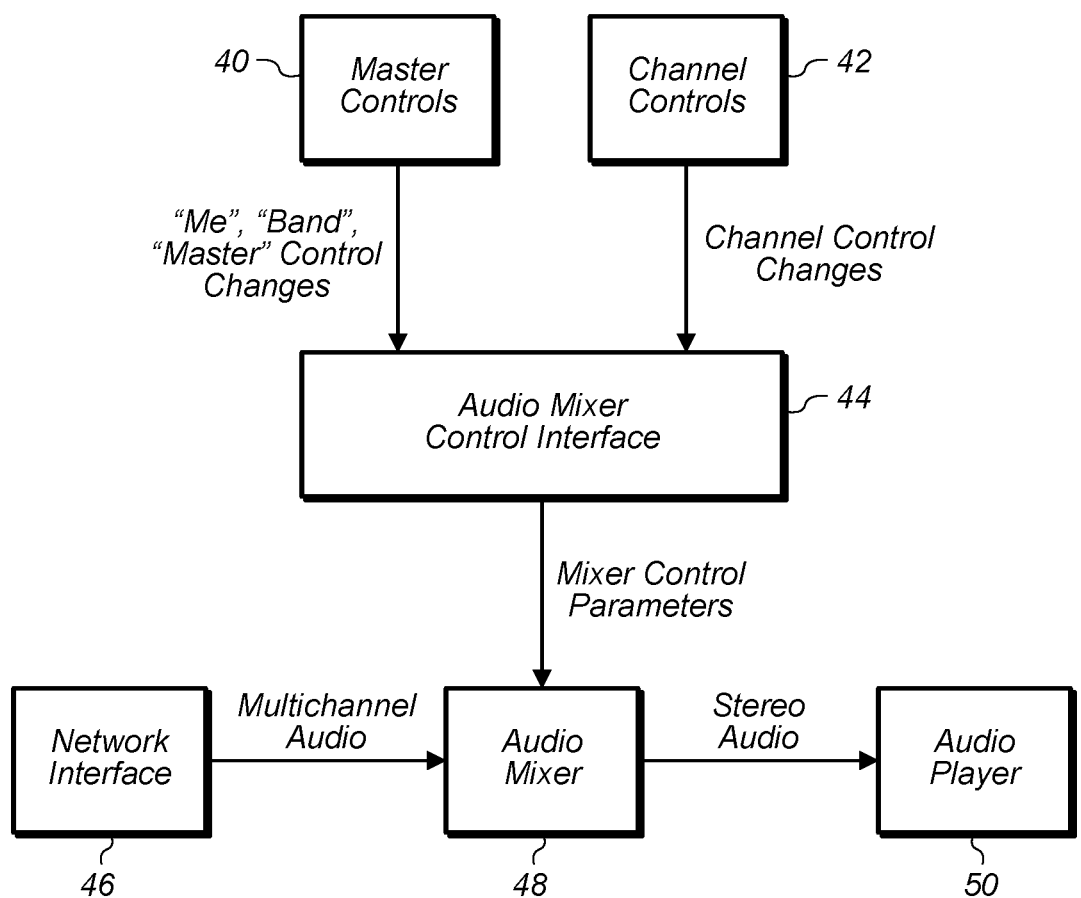
FIG. 4 is a block diagram of one embodiment of a musician's monitor mixer used for balancing a musician's audio mix during a performance or recording session.

FIG. 4 is block diagram of one embodiment of the portions of a musician's monitor mixer system on the musician's portable device 16. The master controls 40, channel controls 42, audio mixer control interface 44, network interface 46, audio mixer 48, and audio player 50 may be components of the musician's monitor mixer system. Each component may be a software module, in one embodiment, including instructions which, when executed on the musician's portable device 16, implement the operation described herein for that component.

The audio mixer control interface 44 may translate the positions of the master controls 40 and channel controls 42, when changed by the user/musician via the interfaces shown above, into a predetermined range of linear values that may be forward to the audio mixer 48.

Based on the input values from the audio mixer control interface 44, the audio mixer 48 may mix the input audio channels received in the multi-channel digital audio stream to produce the audio output. See FIG. 5 for more details of a possible embodiment of this conversion process.

Figure 5:
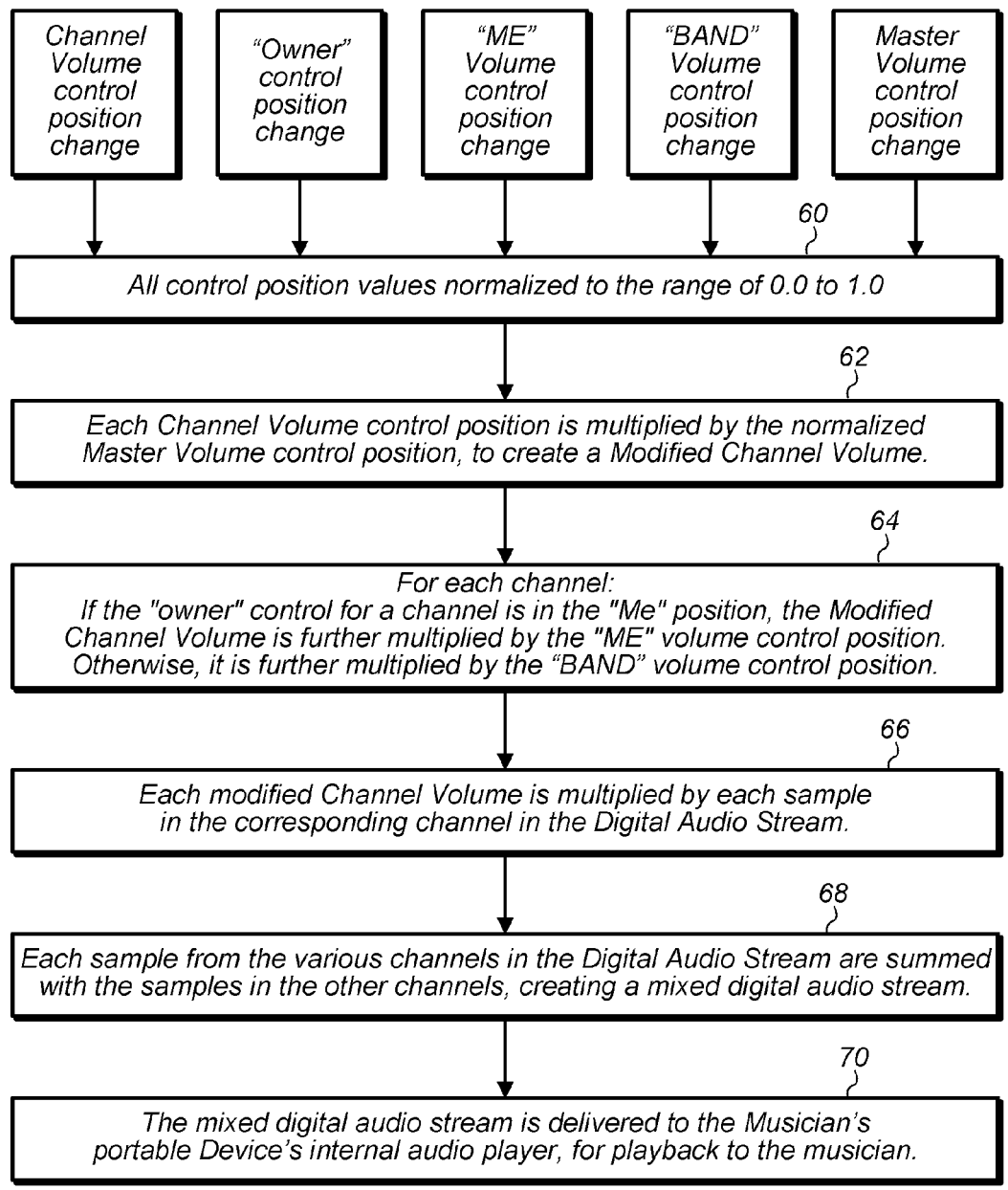
FIG. 5 is a flowchart illustrating operation of one embodiment of the conversion of control positions into audio mixer gain controls.

FIG. 5 is a flowchart illustrating the operation of one embodiment of the conversion of control positions from the human interface into audio output levels.

Control positions may be a normalized value ranging from 0.0 to 1.0 representing a position of the slider control between the low end (0.0) and the high end (1.0). (Block 60)

The control positions may be combined to form a gain level for each of N channels, as follows. ('Channel n' indicates one of N channels in a multi-channel audio stream, where 'n'=1 through N.) Master volume may be the unity gain volume indicated by the master slider control 20 on the master controls user interface (FIG. 2). The me volume and the band volume may similarly be the unity gain volumes indicated by the me slider control 22 and the band slider control 24.

Channel n gain=Channel n Volume×Master Volume (block 62) This gain level maybe further modified as follows:

If Channel n is designated as a "Me" channel (based on the owner control 30 in FIG. 3), Channel n gain=Channel n gain×Me Volume If Channel n is designated as a "Band" channel (based on the owner control 30 in FIG. 3), Channel n gain=Channel n gain×Band Volume (block 64).

Once the channel's gain value has been calculated, it may be multiplied by each of the samples in the channel's audio stream, producing an attenuated value for each sample, X (block 66):

Attenuated sample[X,n]=Sample[X]×Channel n gain

The attenuated samples for each channel, 1 through N, may be summed ("mixed") to form a final output sample, for playback through the portable device's audio output, as follows (block 68):

Output Sample=Sum(Attenuated samples[X,1:N])

The mixed digital audio stream may be the stream of output samples, and may be provided to the audio player 50 in the musician's portable device 16 for playback (block 70).

Figure 6:
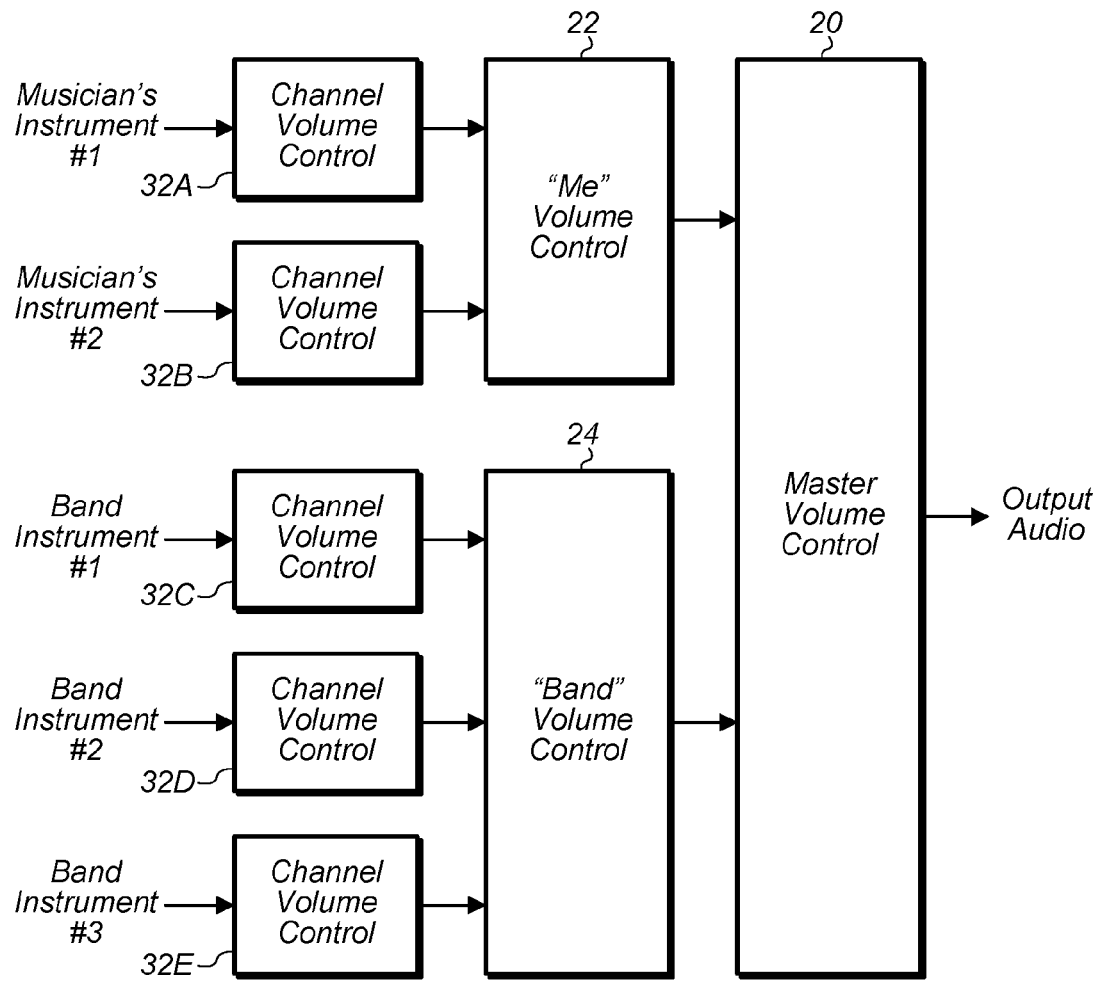
FIG. 6 is a block diagram illustrating operation of one embodiment of the flow of audio from the musicians' instruments to the audio output of each Musician's Portable Device.

FIG. 6 is a block diagram illustrating a flow of each channel from a given instrument (e.g. musical instrument or microphone, for example) to the output audio mix to which the musician may listen. Each instrument's channel(s) may be subject to its individual channel volume control 32A-32E (instances of the channel controls for each channel), as illustrated in FIG. 3. Channels that are assigned to the "band" in the owner control 30 on the channel control may be subject to the "band" volume control 24 shown in FIG. 2, while the channels assigned to the musician's instruments ("me" in the owner control 30 on the channel control) may be subject to the "me" volume control 22. Each channel may then be subject to the master volume control 20 from FIG. 2.

Figure 7:
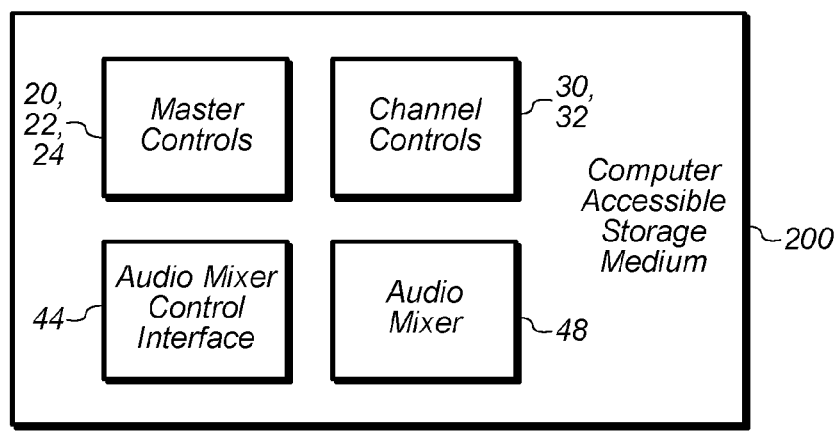
FIG. 7 is a block diagram of one embodiment of a computer accessible storage medium.

FIG. 7 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

In the context of FIG. 7, the computer may be the WiFi enabled mobile device 16. In such embodiments, the computer accessible storage medium 200 may be, for example, Flash memory and/or RAM in the device. Other mobile devices 16 may include various optical or magnetic storage media.

The computer accessible storage medium 200 in FIG. 7 may store the instructions (or "code") for the master controls 20, 22, and 24, the channel controls 30 and 32, the audio mixer control interface 44, and/or the audio mixer 48 as described above.

Numerous variations and modifications will become apparent to those skilled in the art once the above disclosure is fully appreciated. It is intended that the following claims be interpreted to embrace all such variations and modifications.

What is claimed is:

1. A mobile device comprising:
   a network interface configured to communicate over a network;
   a user input/output interface configured to display a user interface to a user and configured to accept user input from the user changing one or more controls on the user interface; and
   a processing system configured to receive a plurality of channels of digital audio over the network interface, wherein the plurality of channels of digital audio are produced by the user and one or more other band members in a live performance, and wherein user input from the user identifies one or more of the plurality of channels as channels contributed by the user and remaining channels of the plurality of channels as channels contributed by the one or more other band members, and wherein the additional user input controls a first volume level of the one or more channels and a second volume level of remaining channels, and wherein the processing system is configured to mix the plurality of channels under control of the volume controls and the channel identification to generate an output audio mix; and
   an audio output configured to receive the output audio mix and to play the output audio mix for the user.

2. The mobile device as recited in claim 1 wherein the processing system is configured to determine an initial volume for a first channel responsive to a channel volume control set by the user through the user interface.

3. The mobile device as recited in claim 2 wherein the processing system is configured to adjust the initial volume responsive to the first volume and the first channel being identified as being contributed by the user.

4. The mobile device as recited in claim 3 wherein the processing system is configured to further adjust the initial volume responsive to a master volume control set by the user through the user interface.

5. The mobile device as recited in claim 2 wherein the processing system is configured to adjust the initial volume responsive to the second volume and the first channel being identified as being contributed by another band member.

6. The mobile device as recited in claim 5 wherein the processing system is configured to further adjust the initial volume responsive to a master volume control set by the user through the user interface.

7. The mobile device as recited in claim 1 wherein the network is a wireless network.

8. A non-transitory computer accessible storage medium storing a plurality of instructions which, when executed by a device, cause the device to:
receive a plurality of channels of digital audio, wherein the plurality of channels of digital audio are produced by the user and one or more other band members in a band during a live performance;
accept user input from the user identifying one or more channels of the plurality of channels as channels contributed the user and remaining channels of the plurality of channels as channels contributed by the other band members;
accept additional user input controlling a first volume level of the one or more channels and a second volume level of remaining channels;
mix the plurality of channels under control of the first volume level, the second volume level, and the channel identification to generate an output audio mix; and
play the output audio mix to the user.

9. The non-transitory computer accessible storage medium as recited in claim 8 wherein the user input identifying the one or more channels as contributed by the user and the remaining channels as contributed by the other band members is provided by an owner control for each channel of the plurality of channels.

10. The non-transitory computer accessible storage medium as recited in claim 9 wherein the owner control and a channel volume control for a given channel are displayed by on a channel control interface when selected by the user.

11. The non-transitory computer accessible storage medium as recited in claim 8 wherein the additional user input comprises adjustments to a first slider associated with the first volume level and a second slider associated with the second volume level.

12. The non-transitory computer accessible storage medium as recited in claim 11 wherein the first slider and the second slider are part of a master control interface displayed when selected by the user.

13. The non-transitory computer accessible storage medium as recited in claim 8 mixing the plurality of channels includes normalizing the first volume level and the second volume level to a range between 0.0 and 1.0.

14. The non-transitory computer accessible storage medium as recited in claim 13 wherein mixing the plurality of channels further comprises normalizing a master volume level to the range.

15. The non-transitory computer accessible storage medium as recited in claim 14 wherein mixing the plurality of channels further comprises multiplying digital samples in each of the one or more channels by the normalized master volume level and the normalized first volume level.

16. The non-transitory computer accessible storage medium as recited in claim 15 wherein mixing the plurality of channels further comprises multiplying digital samples in each of the remaining channels by the normalized master volume level and the normalized second volume level.

17. The non-transitory computer accessible storage medium as recited in claim 16 wherein mixing the plurality of channels further comprises summing the products of the digital samples and the normalized volume levels.

18. A system comprising:
a plurality of portable devices, each portable device corresponding to one of a plurality of musicians; and
a network switch coupled to the plurality of portable devices and distributing a plurality of channels of digital audio to the plurality of portable devices;
wherein the plurality of channels of digital audio are produced by the plurality of musicians, and wherein each device the plurality of portable devices are programmable to identify subsets of the plurality of channels of digital audio that are produced by a respective one of the plurality of musicians that corresponds to that device, and wherein that device is configured to control a volume of the subset of the plurality of channels independent of a volume of the remaining channels, and wherein the plurality of portable devices are programmable to identify subsets of the plurality of channels using a plurality of owner controls, wherein each owner control corresponds to a respective one of the plurality of channels, and wherein each of the plurality of portable devices is independently programmable for the respective musician to which that portable device corresponds.

19. The system as recited in claim 18 wherein the network switch is wirelessly coupled to the plurality of portable devices.

* * * * *